Patented June 3, 1930

1,761,740

UNITED STATES PATENT OFFICE

BIRGER W. NORDLANDER OF SCHENECTADY, NEW YORK, ASSIGNOR TO GENERAL ELECTRIC COMPANY, A CORPORATION OF NEW YORK

MOLDABLE PRODUCT AND PROCESS OF PREPARING THE SAME

No Drawing.    Application filed May 14, 1929.    Serial No. 363,100.

This invention relates to a new and useful thermo-plastic material or moldable product and the process of preparing the same. The possibility of using such a cheap material as sulphur as a binder in molded products has been suggested and tried by many, but as far as I am aware, with little or no success. This is due to the fact that it has not been possible to find a method by which the brittleness of the sulphur can be overcome. As is well known, sulphur, when strongly heated is converted into the elastic, rubbery, amorphous variety, but will in a short time go back into the crystalline and brittle form.

I have discovered, however, that if sulphur is combined with selenium, a compound, selenium sulphide is formed, which is amorphous and possesses such properties that it can be considered as being "stabilized amorphous sulphur." This compound and methods for its preparation I have described and claimed in a copending application, Serial No. 350,836, filed March 28, 1929.

If sulphur and selenium, preferably in the proportion of two mols of sulphur to 1 mol of selenium, are heated together above the melting point of selenium (217° C.), a union takes place so that a cherry red compound, $SeS_2$, is formed. When cooled down to room temperature it forms a black elastic mass, very much like rubber in character. It will retain this condition for several days, but will then gradually go over into a hard, brittle state so that it can be ground up into an orange-red powder with a fusing point of about 100° C. I have found that this conversion can be made to take place in about half an hour if the elastic material is kept at about 80 to 90° C. This change, I believe, is caused by a depolymerization process, the elastic state representing a highly polymerized condition.

I have found that when selenium sulphide is fused with a filler, such for example, as asbestine, slate, iron oxide, talcum, clay, marble dust, ground flint, black natural slate such as keystone filler or Dixie black, diatomaceous earth, wood flour, mica, and others, it will on subsequent "annealing" or "curing" at around 80 to 90° C. go over into a very hard and dense material of great strength. If the sulphide is fused in with the filler at about 125° C. and then cooled down, a plastic material will be formed, which can be pressed up cold and then converted into the hard state by subsequent curing for a very short time, about a half hour, at about 80 to 90° C. As an alternative, the filler and the sulphide can be mixed together and then heated in the mold to about 125° C. It is also possible to mix the sulphur, selenium and filler together, and after heating the mixture to about 250° C. to obtain the same product. In both these latter cases a subsequent curing is necessary to obtain the hard product. If this final product is heated to about 105 to 115° C. it is converted into the soft plastic state and the material thus acts as a reversible thermo-plastic.

The sulphide acts as an excellent binder for cloth and paper. A suspension of $SeS_2$ and $Fe_2O_3$ in denatured alcohol, for example, can be painted on cloth or paper. After evaporation of the solvent the material is pressed up at about 125° C. and after curing forms a very dense, strong and hard product. A formula that has given good results is the following:

50–55% paper or cloth.
25–23% $Fe_2O_3$, asbestine, etc.
25–22% $SeS_2$.

Such a moldable product may be used in forming gears, and all sorts of insulating strips, etc. It is particularly useful as an insulating material since selenium sulphide has very poor electrical conductivity. One very unusual feature of this product is that it is absolutely inert toward water and concentrated acids (except nitric) and can, therefore, be used as a water and acid proof cement. With proper fillers it can in general be used as an acid proof construction material.

One method of using this compound as an acid-proof material is as follows: The selenium sulphide and filler, or the selenium sulphide fused in with the filler, can be suspended in a suitable volatile liquid and then can be sprayed with the aid of a suitable apparatus on any article which it is desired to make acid-proof, as for example, iron. The article is then allowed to dry so that the solvent may evaporate and is then heated to about 105 to 115° C. and finally "cured" for about half an hour at 80 to 90° C. In this way a coating of an acid-proof material is formed on the article.

What I claim as new and desire to secure by Letters Patent of the United States, is:

1. The process of forming a thermo-plastic material which consists in heating selenium sulphide with a filler and subsequently converting the mass to a hard, dense product.

2. The process of forming a thermo-plastic material which consists in heating selenium sulphide with a filler, cooling the mass, and then pressing and subsequently heating.

3. The process of forming a thermo-plastic material which consists in heating sulphur, selenium and a filler at a temperature sufficiently high to form selenium sulphide, and subsequently converting the mass to a hard, dense product.

4. The process of forming a thermo-plastic material which consists in fusing selenium sulphide with a filler at about 125° C., cooling the mass, then pressing, and finally heating at about 80 to 90° C.

5. A thermo-plastic material composed of selenium sulphide fused with a filler and converted into a hard dense product.

6. A thermo-plastic material composed of selenium and sulphur combined with a filler and converted into a hard dense product.

In witness whereof, I have hereto set my hand this 13th day of May, 1929.

BIRGER W. NORDLANDER.